United States Patent [19]

Ahuja et al.

[11] 4,281,381

[45] Jul. 28, 1981

[54] DISTRIBUTED FIRST-COME FIRST-SERVED BUS ALLOCATION APPARATUS

[75] Inventors: Sudhir R. Ahuja, Matawan; Dhiraj K. Sharma, Gillette, both of N.J.

[73] Assignee: Bell Telephone Laboratories, Incorporated, Murray Hill, N.J.

[21] Appl. No.: 38,834

[22] Filed: May 14, 1979

[51] Int. Cl.³ ............................................. G06F 3/04
[52] U.S. Cl. ................................................ 364/200
[58] Field of Search ... 364/200 MS File, 900 MS File; 340/147 LP

[56] References Cited

U.S. PATENT DOCUMENTS

| | | | |
|---|---|---|---|
| 3,638,198 | 1/1972 | Balogh, Jr. | 364/200 |
| 3,689,897 | 9/1972 | Sciuchetti | 364/200 |
| 3,978,451 | 8/1976 | Ito et al. | 340/147 LP |
| 3,983,540 | 9/1976 | Keller et al. | 364/200 |
| 4,017,841 | 4/1977 | Jensen | 364/900 |
| 4,030,075 | 6/1977 | Barlow | 364/200 |
| 4,096,571 | 6/1978 | Vander Mey | 364/200 |
| 4,148,011 | 4/1979 | McLagan et al. | 364/900 |
| 4,161,779 | 7/1979 | Spencer et al. | 364/200 |

Primary Examiner—Gareth D. Shaw
Assistant Examiner—Thomas M. Heckler
Attorney, Agent, or Firm—Thomas Stafford

[57] ABSTRACT

First-come, first-served bus allocation apparatus are distributed to each device sharing a common resource, such as a data bus. Bus allocation is achieved by placing each request from a device for control of the resource in an ordinal ranking with respect to requests from other devices. Requests are assigned positions in the ordinal ranking concurrent with other activity on the data bus. Substantially simultaneous requests are ordered sequentially. As control of the data bus is relinquished by one device, control is transferred to the device whose position in the ordinal ranking is contiguous with that of the relinquishing device. Delay in making this transfer is substantially eliminated.

6 Claims, 2 Drawing Figures

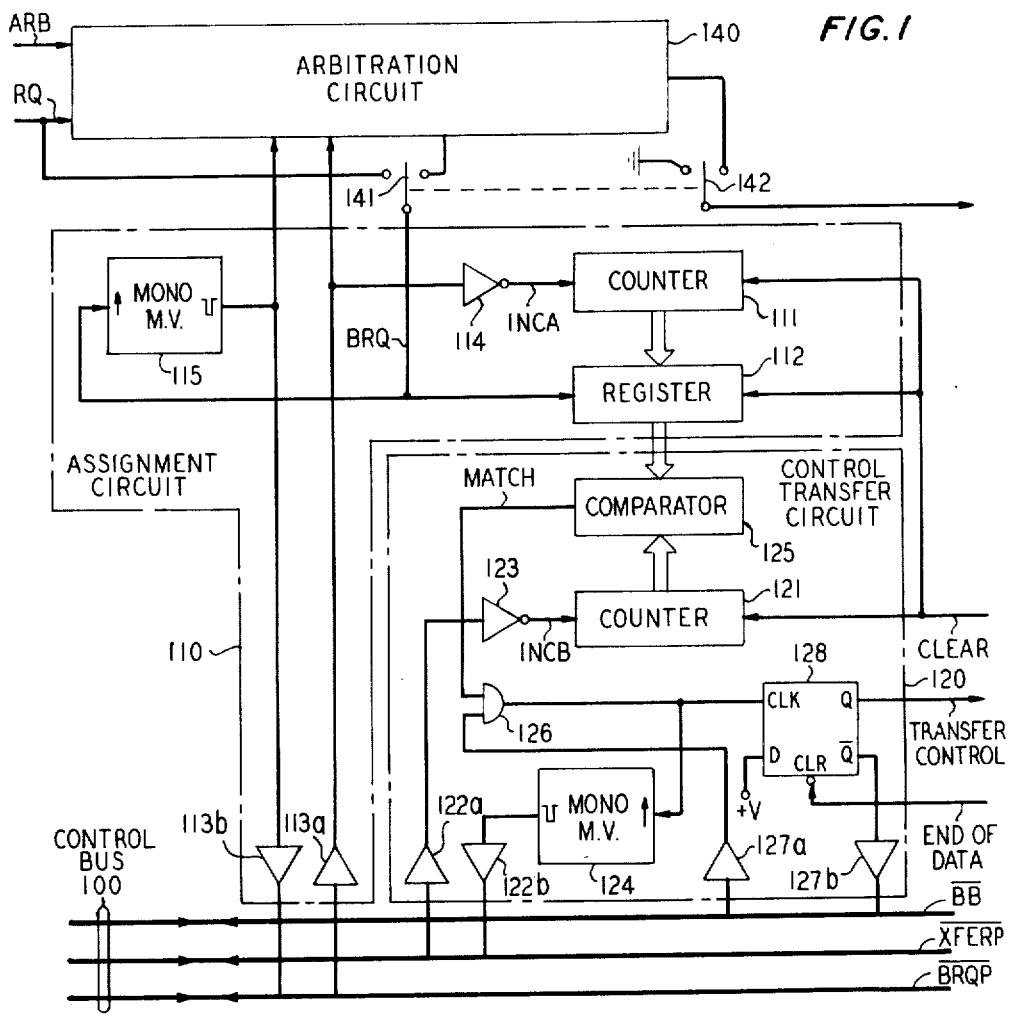

DISTRIBUTED FIRST-COME FIRST-SERVED BUS ALLOCATION APPARATUS

TECHNICAL FIELD

This invention relates to shared resource systems and, more specifically, to apparatus for assigning positions in an ordinal ranking on a first-come, first-served basis to requests from a number of devices for control of the resource.

BACKGROUND OF THE INVENTION

Systems in which many devices share a common resource utilize allocation arrangements for scheduling control of the resource by each device requesting such control. Resource allocation arrangements respond to requests from the devices for access to the resource. Requests are ordered according to a predetermined criterion. Control of the resource is transferred sequentially from one device to another based on the established order.

One criterion used for ordering requests is first-come, first-served. That is, a device, requesting control of the resource, assumes control of the resource before each device making a subsequent request. U.S. Pat. No. 3,638,198 issued to E. Balogh, Jr. on Jan. 25, 1972 discloses a centralized bus allocation arrangement utilizing a first-come, first-served criterion in apparatus called a bus master. The bus master inserts each request in a stack below all previously received requests. When a particular request reaches the top of the stack, control of the bus is transferred to the device which made the particular request. Since each request is associated with a particular device, identifying data about the device, including a device address, are transmitted to the bus master for storage in the stack. Consequently, for efficient, rapid operation in the bus allocation arrangement, a large number of data bus lines must be dedicated for parallel transmission of the identifying data from the requesting devices. Serial transmission is overly time consuming.

U.S. Pat. No. 4,017,841 issued to E. D. Jensen on Apr. 12, 1977 discloses an arrangement utilizing a minimal number of data dedicated bus lines for operation of the data bus allocation arrangement. Jensen discloses a bus allocation system in which devices access a data bus in a fixed, predetermined priority sequence without utilizing a bus master. Each device is assigned at least one predetermined priority. Synchronous counters in each of the devices count through each priority once during every count cycle to allow each device access to the data bus. Thus, each device is allowed access to the data bus without regard to whether a request for such access was actually made. The counters are inhibited from counting when any device accesses the data bus. In this arrangement, it is possible that a device awaiting access to the data bus will be delayed in gaining that access until the counter reaches the predetermined priority of that device. Therefore, a considerable delay is introduced between consecutive accesses by different devices.

SUMMARY OF THE INVENTION

A resource is allocated in such a way that delay between consecutive transfers of control of the resource to devices requesting such control is substantially eliminated.

Such allocation is achieved, in accordance with an aspect of the invention, by allocating a resource so that each device sharing the resource places its request in an ordinal ranking with respect to requests from other devices, placing requests from the devices for control of the resource in the ordinal ranking whether or not the resource is currently under the control of a device and, as control of the resource is relinquished by one device, immediately transferring control to the device whose position in the ordinal ranking is contiguous with the relinquishing device. Delay in making this transfer is substantially eliminated.

In one embodiment of the invention, a request by any device for control of the resource causes both an indicium of an unassigned position in the ordinal ranking stored at each device to be assigned to the device requesting control of the resource independent from and concurrent with transfers of control of the resource and the indicium of the unassigned position to be changed to the indicium of the next unassigned position. Consequently, a device awaiting access to a resource presently controlled by another device is ready to assume control of the resource immediately upon relinquishment of the resource by the other device.

BRIEF DESCRIPTION OF THE DRAWING

A more complete understanding of the invention may be obtained from the following detailed description of a specific embodiment. In the drawing:

FIG. 1 shows a simplified diagram of an autonomous first-come, first-served bus allocation apparatus embodying the invention; and FIG. 2 shows details of an arrangement for a request arbitration circuit employed in the embodiment of the invention shown in FIG. 1.

DETAILED DESCRIPTION

Certain conventions have been adhered to in the drawing and the following description. A brief explanation of each convention follows. All signals are bi-level, e.g. '1' and '0'. Signals $\overline{\text{XFERP}}$, $\overline{\text{BRQP}}$ and $\overline{\text{BB}}$ are normally inactive at the high level, i.e. '1'. Activity of signals $\overline{\text{XFERP}}$ and $\overline{\text{BRQP}}$ is detected in the form of a transition from the high level to the low level. All monostable multivibrators and D flip-flops (at CLK input terminal) trigger on a transition from the low level to the high level. High and low level pulse output signals from the monostable multivibrators are indicated in the figures at the respective multivibrator output. An input signal of $+V$ to a D flip-flop is the high level signal.

FIG. 1 is a simplified circuit diagram of a first-come, first-served (FCFS) resource allocation circuit. One type of resource common in experimental practice is a data bus (not shown in FIG. 1) or, simply, bus. Devices sharing the data bus communicate via the common path provided by the data bus. The FCFS bus allocation circuit arbitrates among simultaneous requests from the devices for control of the data bus, places each request into an ordinal ranking with other requests and transfers control of the data bus to each requesting device according to the ordinal ranking. Distribution of the FCFS bus allocation circuit, as shown in FIG. 1, to each of the devices sharing the data bus permits each device to perform data bus allocation autonomously. Moreover, distribution of the FCFS bus allocation circuit to each device allows a device to request control of the data bus without sending any additional identifying data.

The FCFS bus allocation circuit in each device communicates with additional FCFS bus allocation circuits in other devices via CONTROL BUS 100. Functionally, the data bus and CONTROL BUS 100 are quite different. Signals on CONTROL BUS 100 are used by the FCFS bus allocation circuit to prepare a device requesting control of the data bus to assume that control. After the transfer of bus control from one device to another, the device gaining control of the data bus transmits its data information on the data bus. Therefore, the device interacts directly with the data bus and indirectly with CONTROL BUS 100 through the FCFS bus allocation circuit.

The FCFS bus allocation circuit includes assignment circuit 110, control transfer circuit 120, arbitration circuit 140 and switches 141 and 142. Assignment circuit 110 together with arbitration circuit 140 and switches 141 and 142 establish an ordinal ranking among the devices requesting control of the data bus. Control transfer circuit 120 monitors the ordinal ranking of the device currently in control of the data bus. As the device relinquishes control of the data bus, control transfer circuit 120 transfers control of the data bus to another device whose position in the ordinal ranking is contiguous with the position of the device relinquishing control.

Arbitration circuit 140 is inserted into the FCFS bus allocation circuit by contacting the proper terminals with switches 141 and 142. When inserted, arbitration circuit 140 places substantially simultaneous requests for control of the data bus into a sequential relationship with each other. Thus, the possibility that two or more devices are vying simultaneously for control of the data bus is eliminated. When the devices are so designed that it is not possible for two or more devices to request control of the data bus simultaneously, switches 141 and 142 are positioned to bypass arbitration circuit 140.

In accordance with an aspect of the invention, assignment circuit 110 includes counter 111 for storing an indicium of an unassigned position in the ordinal ranking, monostable multivibrator 115, line driver 113b, line receiver 113a, and inverter 114, in combination, for changing the indicium of the unassigned position stored in counter 111 to the indicium of the next unassigned position in the ordinal ranking, and register 112 for assigning the indicium of the position currently stored in counter 111 to the device requesting control of the data bus. In an example from experimental practice, the indicia of positions in the ordinal ranking are digital representations of ordinal numbers, such as first, second, third and so on. One exemplary set of digital representations is shown by the following correspondences between binary and ordinal numbers: 001 corresponds to first, 010 corresponds to second, 011 corresponds to third, etc. Indicia, as shown here, are quite similar to priorities as known in the prior art.

Initially, signal CLEAR, which is generated by the device, causes initial indicia to be stored in counter 111 and register 112. Requests from each device for control of the data bus are monitored on the signal path from CONTROL BUS 100 through line receiver 113a and inverter 114. Signal $\overline{BRQP}$ is related to the requests from each device for data bus control. In response to signal $\overline{BRQP}$, the combination of line receiver 113a and inverter 114 generate signal INCA changing the indicium of the unassigned position stored in counter 111 to the indicium of the next unassigned position in the ordinal ranking.

Signal BRQ, supplied via switch 141, indicates that one device associated with the FCFS bus allocation circuit is requesting control of the data bus. After a request for control of the data bus occurs, the indicium currently stored in counter 111 is transferred to register 112. That is, the particular device requesting control of the data bus is assigned the indicium of the ordinal position currently stored in counter 111. Concurrently, monostable multivibrator 115 and line driver 113b, in combination, generate signal $\overline{BRQP}$ in response to signal BRQ. At this time, the device is prepared to assume control of the data bus.

From the previous description, it is clear that assignment circuit 110 operates independent from control transfer circuit 120. Furthermore, assignment circuit 110 operates concurrent with control transfer circuit 120. Assignment of indicia to requesting devices is accomplished at each of the requesting devices whether or not a device is currently controlling the data bus. Each device requesting control of the data bus is prepared, almost immediately upon request, to assume that control. Therefore, as control of the data bus is relinquished by one device, control of the data bus can be assumed by another device with minimal delay occurring in the transfer.

Control of the data bus is transferred to one device when the indicium assigned to the device relinquishing control of the data bus is contiguous with the indicium assigned to the device requesting control. If no device is in control of the data bus at the time the indicium is assigned to the device requesting control, then control of the data bus is transferred directly to the requesting device thereby eliminating delay in transferring control of the data bus.

Control transfer circuit 120 transfers control of the data bus to the device whose position in ordinal ranking is contiguous with the position in ordinal ranking of the device relinquishing control. To accomplish this function, control transfer circuit 120 includes counter 121 for storing an indicium of the position in an ordinal ranking, monostable multivibrator 124, line driver 122b, line receiver 122a and inverter 123, in combination, for changing the indicium stored in counter 121 to the indicium of the next position in the ordinal ranking and, in combination, comparator 125, line receiver 127a, AND gate 126 and D flip-flop 128 for transferring control of the data bus to the requesting device assigned the indicium contiguous with the indicium of the device relinquishing control.

Signal CLEAR causes counter 121 to be set to a predetermined indicium which, in experimental practice, is the same as the initial indicium in counter 111. Transfer of data bus control from one device to another is indicated by signal $\overline{XFERP}$ on CONTROL BUS 100. A signal path from CONTROL BUS 100 through line receiver 122a and inverter 123 monitors activity of signal $\overline{XFERP}$. In response to signal $\overline{XFERP}$, the combination of line receiver 122a and inverter 123 generates signal INCB changing the indicium stored in counter 121 to the indicium of the next position in the ordinal ranking.

When the indicia stored in counter 121 and in register 112 are the same, comparator 125 generates signal MATCH to so indicate. This condition signifies that the next device to gain control of the data bus is the particular device whose assigned indicium has caused the condition of equality to occur.

Signal $\overline{BB}$ from CONTROL BUS 100 represents a state of device control of the data bus. That is, whether a device is currently in control of the data bus or not. When both signal $\overline{BB}$ indicates that no device is in control of the data bus and signal MATCH shows equality of indicia in register 112 and counter 121, the combination of line receiver 127a, AND gate 126, D flip-flop 128, monostable multivibrator 124 and line driver 122b and 127b generates signal TRANSFER CONTROL to cause a transfer of control of the data bus to the particular device, generates signal $\overline{BB}$ indicating that the device is in control of the data bus and generates signal XFERP to change the indicium of the position in the ordinal ranking in counter 121. Signal TRANSFER CONTROL is now at the high level. When the device has completed its use of the data bus, signal END OF DATA is generated by the device causing signal TRANSFER CONTROL to return to the low level and signal $\overline{BB}$ to indicate that no device is currently in control of the data bus. Thus, the device relinquishes control of the data bus.

Switches 141 and 142 cooperate to connect or bypass arbitration circuit 140 in the FCFS bus allocation circuit in FIG. 1. "Coupling" of switches 141 and 142, indicated by the dashed connecting line between the same, insures that both switches are connected simultaneously to either their respective leftmost terminals or their respective rightmost terminals. When connected to the leftmost terminals, switches 141 and 142 bypass arbitration circuit 140. When connected to the rightmost terminals, switches 141 and 142 connect arbitration circuit 140 to the FCFS bus allocation circuit.

If the devices sharing the data bus are assigned so that two or more devices do not produce substantially simultaneous requests for control of the data bus, then switches 141 and 142 are connected to their respective leftmost terminals. In this configuration, signal RQ is transmitted from the device through switch 141 to assignment circuit 110.

If substantially simultaneous requests from two or more devices do occur, switches 141 and 142 are connected to their respective rightmost terminals to include arbitration circuit 140 in the FCFS bus allocation circuit. Arbitration circuit 140 sequentially orders substantially simultaneous occurrences of requests for control of the data bus. All requests for control of the data bus are monitored by arbitration circuit 140. When one device requests control of the data bus, arbitration circuit 140 stores the request until signal ARB is received and ongoing request activity monitored through line receiver 113a ceases. After these conditions are met, arbitration circuit 140 regenerates the stored request signal at the rightmost terminal of switch 141 and generates a delayed replica of signal ARB at the rightmost terminal of switch 142. Switch 142 supplies its output signal as signal ARB to an arbitration circuit 140 in an FCFS bus allocation circuit in another device (not shown). Since signal ARB is received by arbitration circuit 140 in each device in succession, simultaneous occurrences of requests are ordered according to the occurrence of a request for control and signal ARB at each arbitration circuit 140.

FIG. 2 is a detailed circuit diagram of arbitration circuit 140. Two circuit paths are of interest: first, D flip-flops 201 and 202, AND gate 203, monostable multivibrator 204 and OR gate 205; and second, delay 206, AND gate 207 and OR gate 205.

Signal RQ from the device sets the Q output signal of D flip-flop 201 to a high signal level thereby storing the request from the device for control of the data bus. When signal ARB is received by D flip-flop 202, the request stored in D flip-flop 201 is transferred to D flip-flop 202. D flip-flop 201 is cleared immediately after this transfer. If other requests, simultaneous or not, are being processed at this time, AND gate 203 receives a corresponding low level signal from line receiver 113a to inhibit any change in the output signal from AND gate 203. After the other request activity ceases, a high level signal is received from line receiver 113a allowing AND gate 203 to generate signal BRQ indicating that the particular associated device is requesting control of the data bus. At this point, a request occurring substantially simultaneous with other requests is ordered in sequence order with the other such requests. Monostable multivibrator 204 responds to signal BRQ to generate a pulse output signal which OR gate 205 transmits to the rightmost terminal switch 142. Shortly after signal BRQ is generated, monostable multivibrator 115 generates an output pulse signal which clears D flip-flop 202 of the request for bus control.

In the second circuit path of arbitration circuit 140, signal ARB is delayed for a nominally short period of time by delay 206. The delay, in practice about four times the normal propagation delay of a logic gate, allows enough time for a request to be processed by D flip-flop 202 thereby inhibiting delayed signal ARB at AND gate 207. If no request is made, AND gate 207 and OR gate 205 allow delayed signal ARB to pass uninhibited to the output of arbitration circuit 140 at the rightmost terminal of switch 142.

The preferred embodiment of the FCFS bus allocation circuit in FIG. 1 is achieved by collocating one FCFS but allocation circuit with each of the devices sharing the data bus. However, certain circuit elements can be eliminated from the individual FCFS bus allocation circuits and replaced by a central group of circuit elements performing the same function. For example, if inverter 114 and counter 111 are removed from assignment circuit 110 in each device, the resulting collection of inverters and counters is replaced by a single inverter and counter centrally located for storing the indicium of the unassigned position in the ordinal ranking and for changing the stored indicium to the indicium of next unassigned position in the ordinal ranking. Similarly, if inverter 123 and counter 121 are taken from control transfer circuit 120 in each device, the resulting collection of inverters and counters is replaced by a single inverter and counter centrally located for storing the indicium of an ordinal position and for changing the shared indicium to the indicium of the next ordinal position. Also, the collection of arbitration circuits 140 can be replaced by a single arbitration circuit 140 for placing substantially simultaneous occurrences of requests for control of the data bus in sequence.

We claim:

1. A first-come first-served resource allocation system in which a plurality of devices share a common resource, each device being adapted for requesting control of said resource and for relinquishing control of said resource, said system including means (110, 140, 141, 142) for establishing an ordinal ranking among successive ones of said devices requesting control of said resource and means (120) responsive to relinquishment of control of the resource by a device contiguous in said ordinal ranking with an individual one of said devices for transferring control of said resource to the individual one of said requesting devices, said rank establishing means (110, 140, 141, 142) characterized by,
- first means (111) for storing an indicium of an unassigned ordinal position,
- separate means (112) associated with respective ones of said devices responsive to a request for control of said resource by one of said devices for assigning to that same device the indicium of the unassigned ordinal position currently stored in said first storing means (111), and
- first means (113a, 113b, 114, 115) responsive to each request for control of said resource by any of said devices for changing the indicium of the assigned ordinal position in said first storing means (111) to the indicium of the next unassigned ordinal position,
- wherein the rank establishing means operates independent from and concurrent with the means for transferring control of the resource thereby allowing control to be transferred from one device relinquishing control of the resource to the requesting device with minimal delay.

2. Apparatus as defined in claim 1 wherein said means (120) for transferring control of said resource is characterized by,
- second means (121) for storing the indicium of an ordinal position,
- second means (122a, 122b, 123, 124) responsive to each transfer of control of said resource from any one device to any other of said devices for changing the indicium of the ordinal position in said second storing means (121) to the indicium of the next ordinal position, and
- separate means (125, 126, 127a, 128) associated with each of said devices jointly responsive to the indicium of the ordinal position assigned to the requesting device and to the indicium of the ordinal position currently stored in said second storing means (121) for transferring control of the resource to said requesting device.

3. Apparatus as defined in claim 1 wherein separate first storing means (111) and separate indicium changing means (113a, 113b, 114, 115) are associated with each of said devices.

4. Apparatus as defined in claim 2 wherein separate second storing means (121) and separate second indicium changing means (122a, 122b, 123, 124) are associated with each of said devices.

5. Apparatus as defined in claim 1 wherein said rank establishing means (110, 140, 141, 142) is further characterized by,
- means (201 through 207 inclusive) responsive to each request for control of said resource by any of said devices for ordering substantially simultaneous occurrences of said request in a sequential relationship.

6. Apparatus as defined in claim 5 wherein separate ordering means (201 through 207 inclusive) is associated with each of said devices.

* * * * *